United States Patent [19]

Miyagawa et al.

[11] Patent Number: 5,767,425
[45] Date of Patent: Jun. 16, 1998

[54] SURFACE BEARING FOR INDICATING INSTRUMENT

[75] Inventors: Isao Miyagawa, Kariya; Takashi Koumura, Toyota, both of Japan

[73] Assignee: Denso Corporation, Kariya, Japan

[21] Appl. No.: 787,854

[22] Filed: Jan. 23, 1997

[30] Foreign Application Priority Data

Jan. 29, 1996 [JP] Japan .................. 8-013245
Feb. 14, 1996 [JP] Japan .................. 8-027030
Oct. 28, 1996 [JP] Japan .................. 8-285441

[51] Int. Cl.$^6$ .................................... F16C 33/82
[52] U.S. Cl. ........................... 73/866.3; 384/408
[58] Field of Search ................... 73/866.3, 430,
73/866.1; 384/322, 368, 370–372, 377,
379, 387, 397, 401, 402, 408, 415, 462

[56] References Cited

U.S. PATENT DOCUMENTS

| | | | |
|---|---|---|---|
| 1,184,050 | 5/1916 | Toeplitz | 384/408 |
| 1,331,440 | 2/1920 | Lamy | 384/387 |
| 3,013,847 | 12/1961 | Gits | 384/402 |
| 3,250,932 | 5/1966 | Tupper | 384/408 |
| 4,371,220 | 2/1983 | Brucher | 384/371 |

FOREIGN PATENT DOCUMENTS

| | | |
|---|---|---|
| 57-144621 | 3/1956 | Japan . |
| 57-147766 | 3/1956 | Japan . |
| 7-000941 | 1/1995 | Japan . |

*Primary Examiner*—Robert Raevis
*Attorney, Agent, or Firm*—Cushman, Darby & Cushman IP Group of Pillsbury Madison & Sutro LLP

[57] ABSTRACT

A bobbin unit for a cross-coil type meter is composed of an upper bobbin and a lower bobbin. The upper and lower bobbins have an inner cylindrical portion which has a center through hole for receiving a indicator shaft therein. A bearing portion is formed at an edge portion of the center through hole and an oil reservoir portion is formed at a portion in the center through hole adjacent to the bearing portion. The reservoir portion has an inside diameter larger than that of the bearing portion and accommodates a lubricating oil. The reservoir portion is composed of a first annular groove for supplying the lubricating oil to the bearing portion by the capillary action, an oil holding groove and a seal portion having a small gap between the shaft and the inner periphery of the center through hole.

14 Claims, 6 Drawing Sheets

SURFACE BEARING FOR INDICATING INSTRUMENT

CROSS REFERENCE TO RELATED APPLICATION

The present application is based on and claims priority from Japanese Patent Applications No. Hei 8-13245 filed on Jan. 29, 1996, Hei 8-27030 filed on Feb. 14, 1996, and Hei 8-285441 filed on Oct. 28, 1996, the contents of which are incorporated herein by reference.

BACKGROUND OF THE INVENTION

1. Field of the Invention

The present invention relates to a surface bearing for an indicating instrument and an indicating instrument using the surface bearing.

2. Description of the Related Art

JPY2 7-941 discloses a conventional indicating instrument having a surface bearing. The indicating instrument includes an upper and lower bobbins having cylindrical members, a rotary magnet disposed between the bobbins and an indicator shaft which is connected to the rotary magnet and supported by a surface bearing disposed in the cylindrical members. The shaft carries an indicator at the upper end extending from the cylindrical member of the upper bobbin.

The cylindrical member of the upper bobbin has, at the top thereof, an annular oil receiver of a diameter larger than that of the surface bearing. The oil reservoir is open to the outside and, therefore, oil is not sufficiently supplied to the surface bearing due to leakage of the oil, causing lubrication problems.

SUMMARY OF THE INVENTION

The present invention has an object of providing an improved surface bearing supplied with sufficient lubrication oil and an indicating instrument having such improved surface bearing.

According to a feature of the present invention, a surface bearing disposed in an inner periphery of a body member. The surface bearing includes a bearing portion disposed at an edge of the inner periphery to rotatably support a shaft, a lubricating oil reservoir portion disposed at a portion of the inner periphery adjacent to the bearing portion for holding lubricating oil together with the shaft, a seal portion formed at a portion of the inner periphery adjacent to the lubricating oil reservoir portion opposite said bearing portion for preventing leakage of the lubricating oil together with the shaft.

According to another feature of the invention, an improved indicating instrument including an indicator, a indicator shaft, a driving unit and a housing having a through hole for receiving the indicator shaft is provided. The indicating instrument has a bearing portion disposed at an edge of the through hole for supporting the indicator shaft, an oil reservoir portion disposed at a portion in the through hole adjacent to the bearing portion, and a seal portion formed at a portion in the through hole adjacent to the reservoir.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

Figure 1:
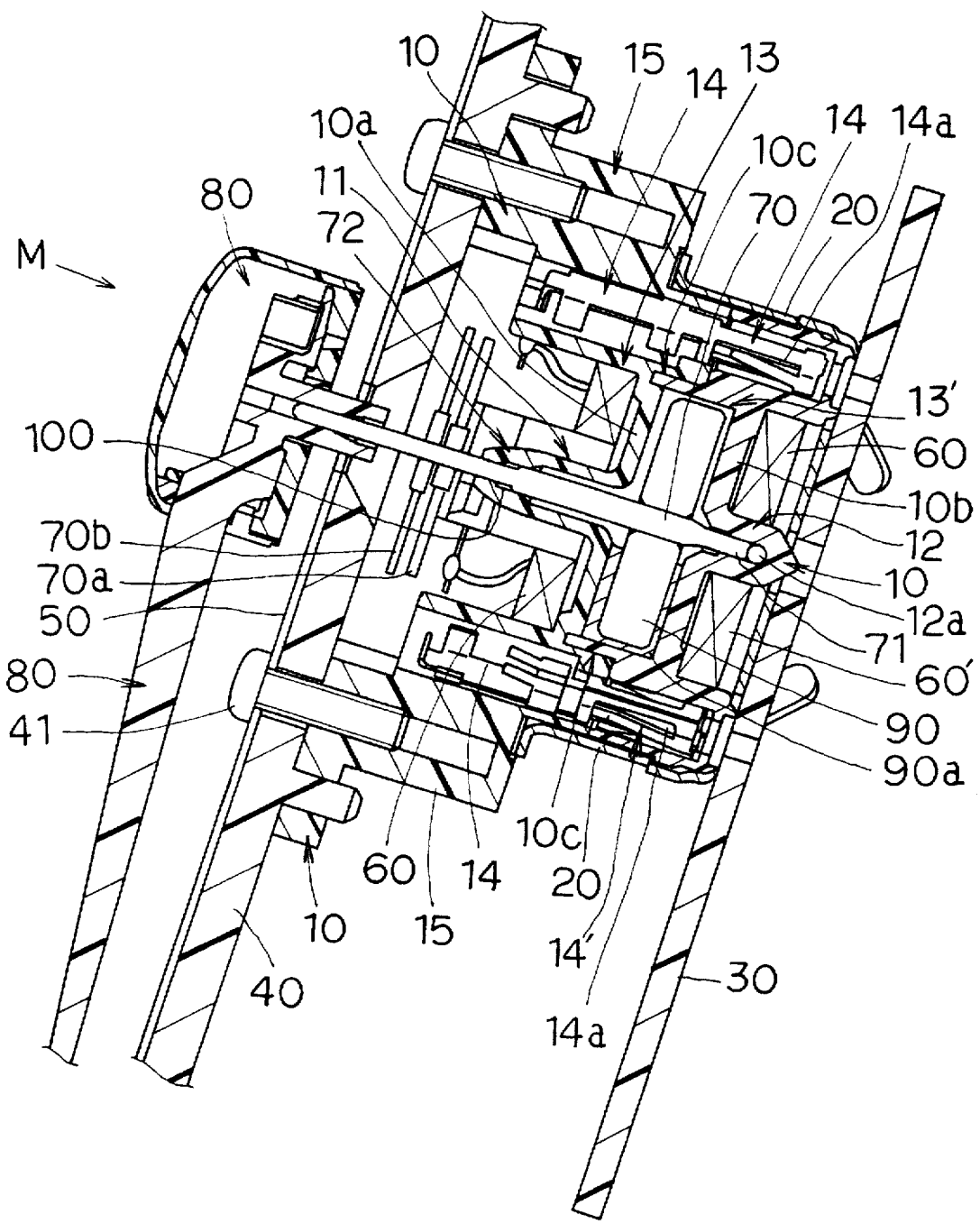
FIG. 1 is a cross-sectional side view illustrating a main portion of an indicating instrument having a surface bearing according to a first embodiment of the present invention.
Figure 2:
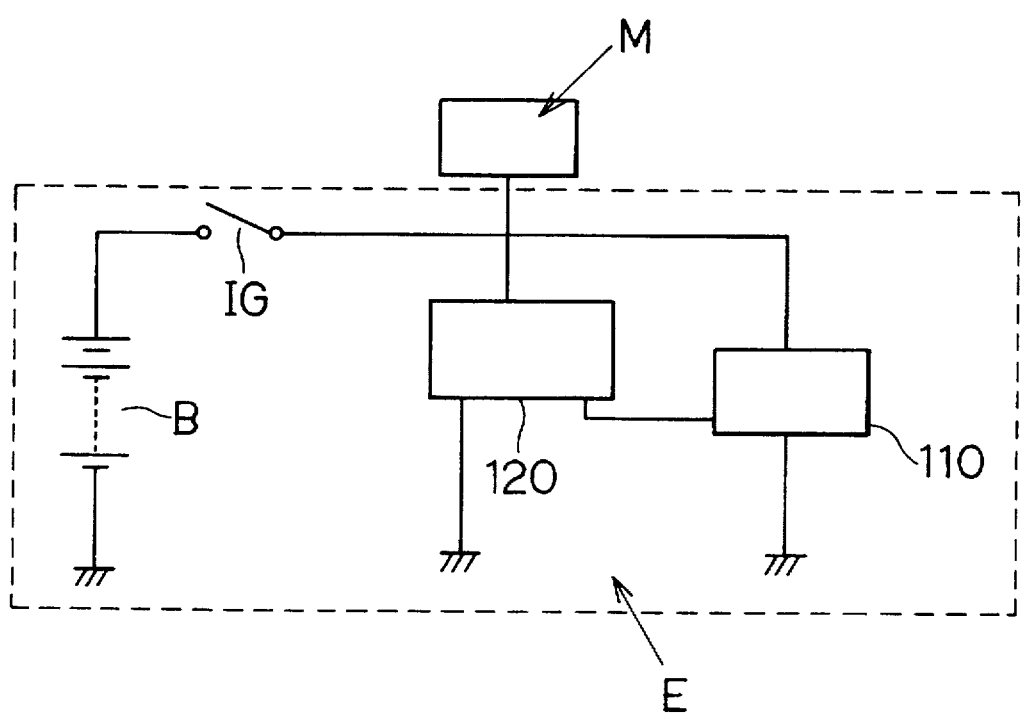
FIG. 2 is a block diagram of a driving unit for the indicating instrument shown in FIG. 1.

A cross-coil type indicating instrument according to a first embodiment is described with reference to FIGS. 1 and 2. The cross-coil type indicating instrument is generally used for a speedometer and a fuel gauge. Such an indicator instrument is composed of a meter unit M and a control unit E. When the indicating instrument is installed into an instrument panel of a vehicle, the shaft of the indicator is inclined as shown in FIG. 1.

The meter unit M includes a bobbin unit 10 which is composed of an upper resinous bobbin 10a and a lower resinous bobbin 10b. The lower bobbin 10b is held in a cup-shaped casing 20 which is fixed to a circuit board 30 by connecter terminals 14a. The connector terminals 14a are insert-molded in the lower bobbin 10b to connect the circuit board 30 and a cross coil 60 electrically.

The upper bobbin 10a has a first inner cylindrical member 11 and a first outer cylindrical member 13, and the lower bobbin 10b has a second inner cylindrical member 12 and a second outer cylindrical member 13'. An indicator shaft 70 is disposed in the first and second inner cylindrical members 11 and 12, and coils 60 and 60' are accommodated inside the first and second outer cylindrical members 13 and 13'. A permanent magnet 90 is disposed between the first upper and second bobbins 11 and 12 inside an cylindrical extension 10c of the second outer cylindrical member 13'. The first inner cylindrical member 11 has a small center hole at an edge thereof to receive the indicator shaft 70 and the second inner cylindrical member 12 has a ball bearing 12a at the bottom of a center hole to support the base end 71 of the indicator shaft 70. The upper and lower bobbins 10a and 10b are connected by the cylindrical extension 10c being fitted into an annular groove formed on the back of the first outer cylindrical member 13. The upper bobbin 10a has connector cases 14 accommodating the connector terminals 14a and boss portions 15 having female screws for screw bolts 41.

A plurality of connector cases 14' are also formed in the lower bobbin 10b to accommodate the connector terminals 14a together with the connector case 14 of the upper bobbin 10a.

A pair of cross-coils 60 and 60' wound on the first and second inner cylindrical members 11 and 12 respectively. The cross-coils 60 and 60', the upper and lower bobbins 10a, 10b and the permanent magnet 90 compose a driving section which drives the indicator shaft 70. The control unit E is composed of a speed sensor 110, a driving circuit 120 fixed to the circuit board 30 of the meter unit M, an ignition switch IG and a battery. The speed sensor 110 detects the rotational speed of the vehicle transmission-output-shaft and generates a pulse signal, and the driving circuit 120 controls the driving current supplied to the cross-coils 60 and 60' according to the pulse signal.

When the cross-coils 60 and 60' are supplied with the driving current from the battery B through the ignition switch IG, the indicator shaft 70 is rotated by a composite magnetic force generated by the cross-coils 60 and 60' and the permanent magnet 90 to indicate a vehicle speed.

A viscous damper oil 90a such as silicone oil is contained in a chamber which is formed by the cylindrical extension 10c and the back surfaces of the upper and lower bobbins 10a and 10b and accommodates the permanent magnet 90 therein. The damper oil 90a protects the meter unit M from vibrations transmitted from the outside and ensures smooth starting of the indicator. A zero-return spring 70a and a retainer plate 70b are disposed around the indicator shaft near the top of the first inner cylindrical member 11.

Figure 3:
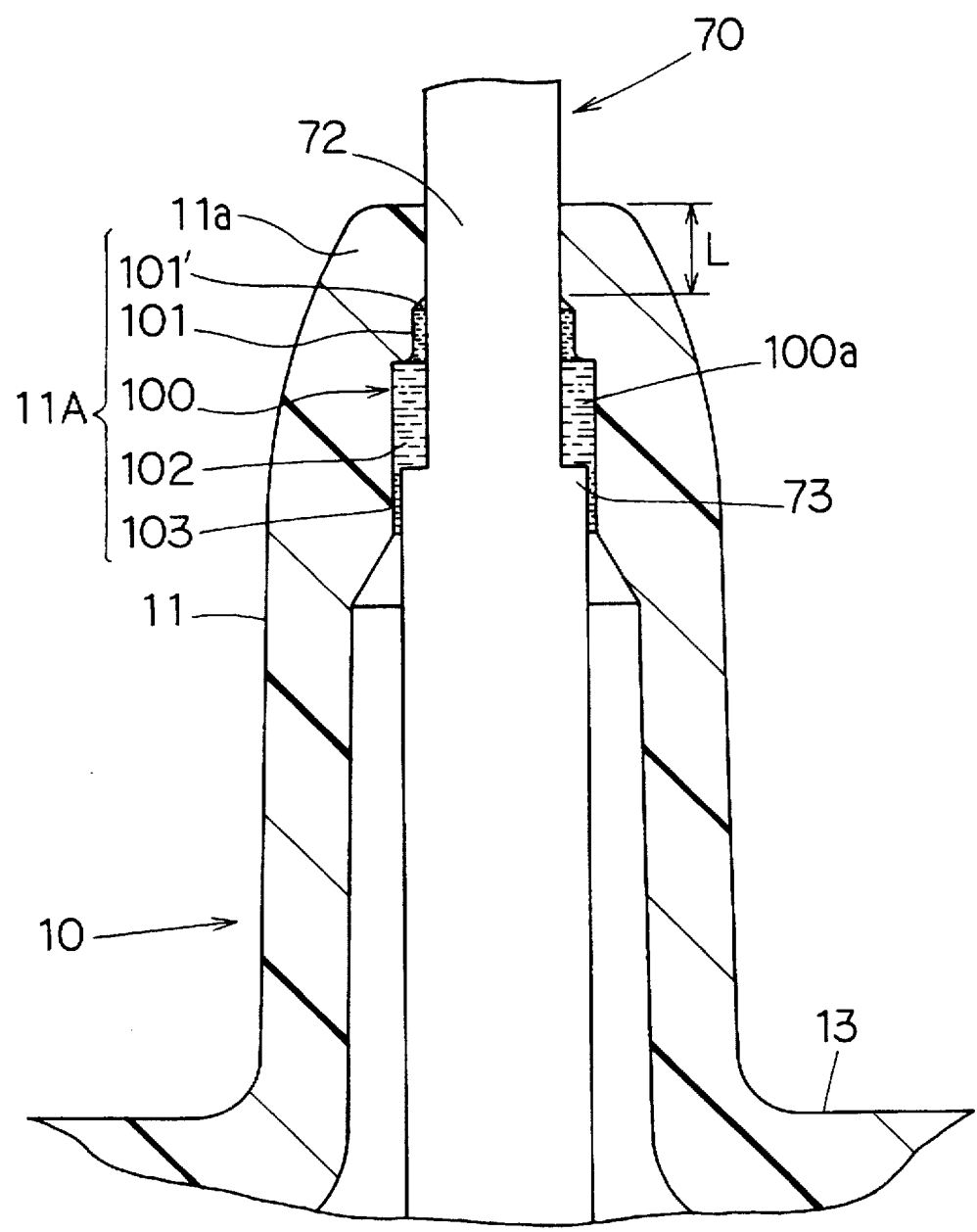
FIG. 3 is an enlarged cross-sectional view illustrating a main portion of an upper bobbin and a shaft of an indicator.

The indicator shaft 70 has a slide portion 72, which is supported by a surface bearing portion 11A formed on the inner periphery of the first inner cylindrical member 11 as shown in FIG. 3. The surface bearing portion 11A is composed of an edge bearing portion 11a formed on the edge of the first inner cylindrical member 11, an oil reservoir portion 100 and a seal portion 103. The inside diameter of the edge bearing portion 11a is larger by a thickness of the oil film supplied from the reservoir portion 100 than the diameter of the slide portion 72 of the indicator shaft 70. The axial length L of the edge bearing portion 11a is about 0.5 mm.

A first annular groove 101 with a chamfer 101' is formed at a portion adjacent to the edge bearing portion 11a, and a second annular groove 102 is formed at a portion adjacent to the first annular groove 101, thereby forming a oil reservoir portion 100. The inside diameter of the second annular groove 102 is larger than that of the first annular groove 101 so that the gap between the first annular groove 101 and the slide portion 72 becomes ⅓ to ⅕ of the gap between the second groove 102 and the slide portion 72. The gap between the second groove 102 and the slide portion 70 of the indicator shaft 70 is about 0.1 mm to hold lubricating oil 100a therein. The lubricating oil is stored in the gap between the groove 102 and the slide portion 72 of the indicator shaft 70. The lubricating oil has a comparatively high viscosity such as silicone oil for the damper oil 90a. An oil seal portion 103 is inserted in a gap between the second annular groove 102 and the outer periphery (seal surface) of the indicator shaft 70 adjacent to the a shoulder portion 73 shown in FIG. 3 to prevent leakage of the lubricating oil 100a.

The lubricating oil 100a is supplied to the edge bearing portion 11a by the capillary action from the first annular groove 101 through the chambfer 101'. Because the oil is supplied by the capillary action, the oil does not scatter to the outside due to vibration of the meter unit M.

When the indicator shaft 70 rotates for a long time and the first annular groove 101 runs short of the lubricating oil 100a, it is supplied from the second annular groove 102 by dragging action of the indicator shaft 70. Because of the difference between the first annular groove 101 and the second annular groove 102, the lubricating oil is supplied to the edge bearing effectively.

When the indicating instrument is assembled, the lubricating oil 100a is filled in the surface bearing portion 11A from the open side of the second groove 102 shown in FIG. 3 before the indicator shaft 70 is inserted therein. When the shaft 70 is inserted thereafter, an excessive volume of the lubricating oil is squeezed out of the opening of the edge bearing portion 11a, so that a suitable amount of the lubricating oil 100a is held in the oil reservoir portion 100.

The surface bearing portion 11A also prevents the damper oil 90a from leaking from the space between the upper and lower bobbins 10a and 10b. That is, the space containing the damper oil 90a is sealed by the edge bearing portion 11a and the oil seal portion 103.

The reservoir portion 100 can be formed to taper off toward the edge bearing portion 11a instead of the step-shape composed of the first and second annular grooves 101 and 102.

Figure 4:
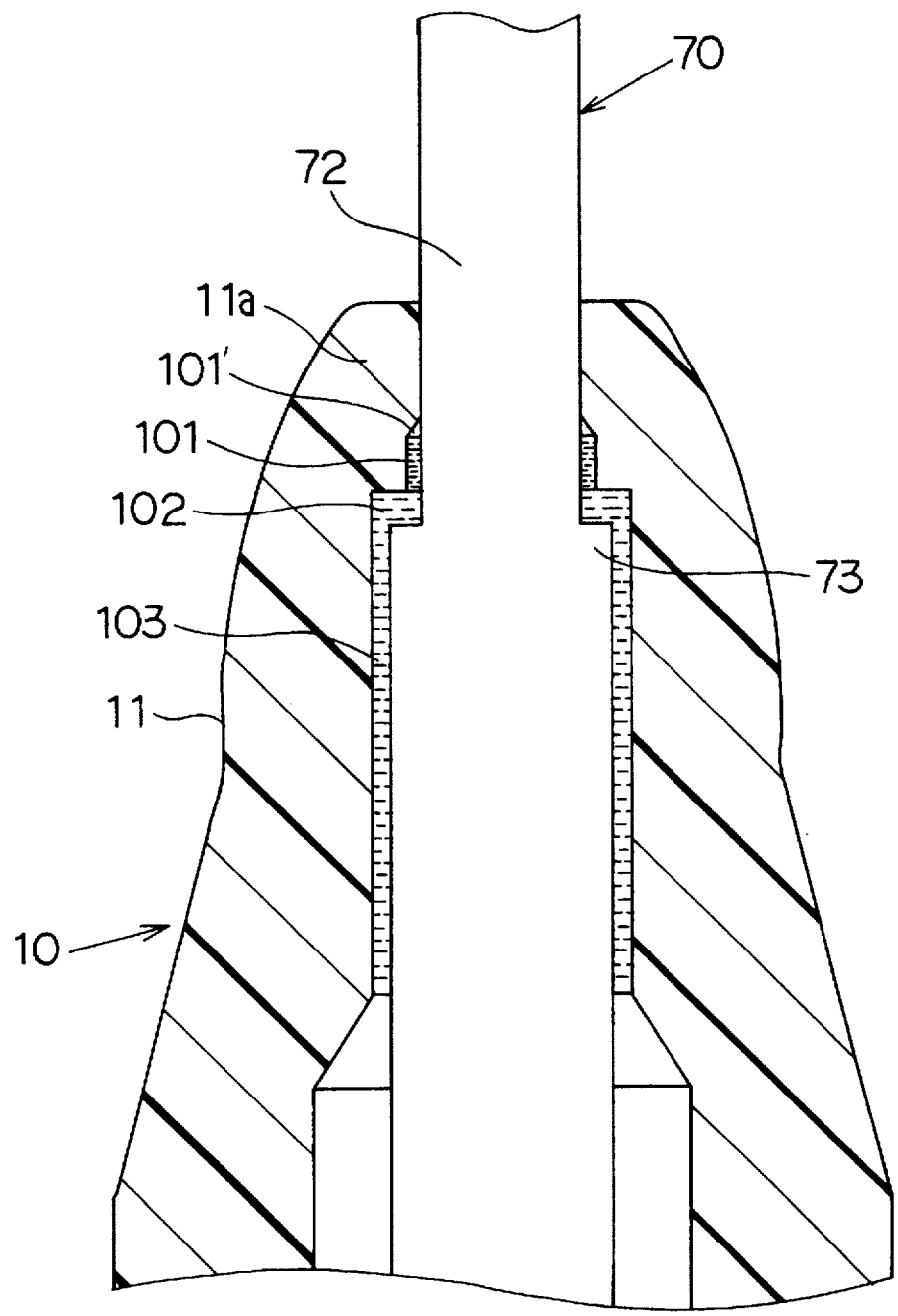
FIG. 4 is a cross-sectional side view illustrating a main portion of the first embodiment.

As a variation of the surface bearing according to the first embodiment, length of the seal portion 103 is extended to be longer than the length of the second groove 102 as shown in FIG. 4. Thus, the sealing effect is increased.

Figure 5:
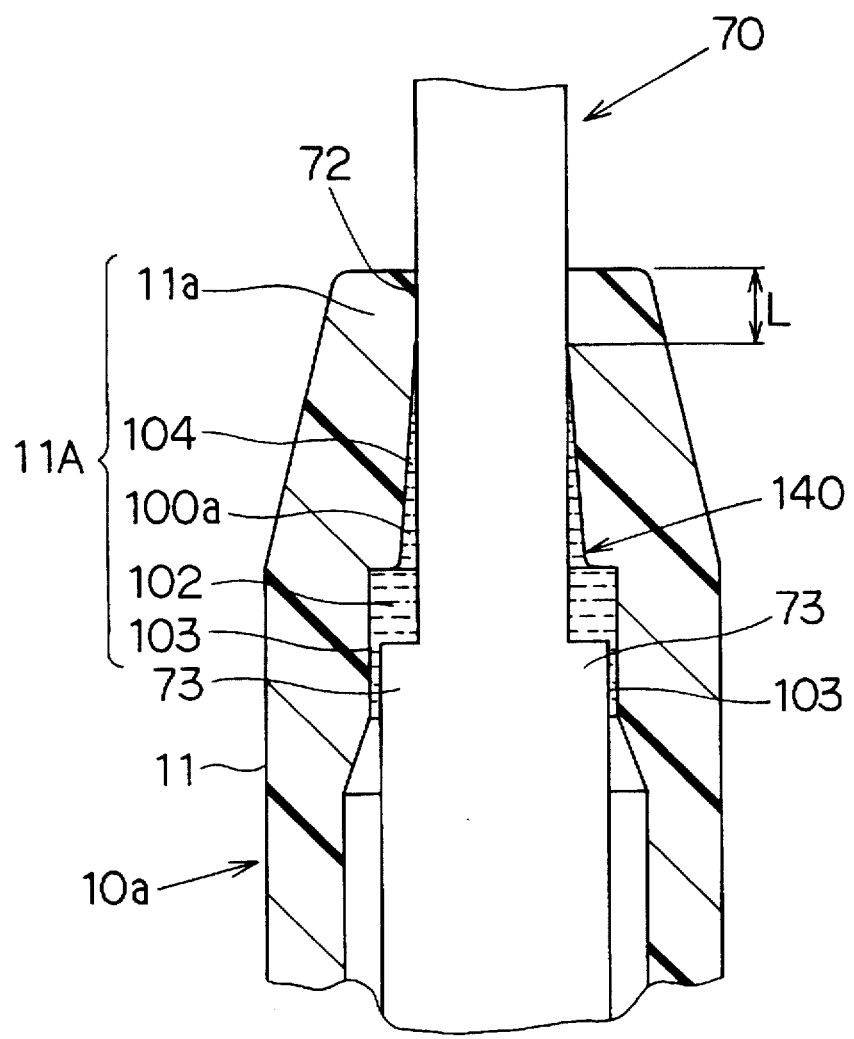
FIG. 5 is a cross-sectional view illustrating a main portion of a variation of the first embodiment.

As another variation, an oil reservoir 140 has a surface 104 tapering off toward the edge bearing portion in stead of the first annular groove 101 as shown in FIG. 5. The lubricating oil 100a is held in the oil reservoir 140 and supplied to the edge bearing portion 11a by the capillary action.

(Second Embodiment)

Figure 6:
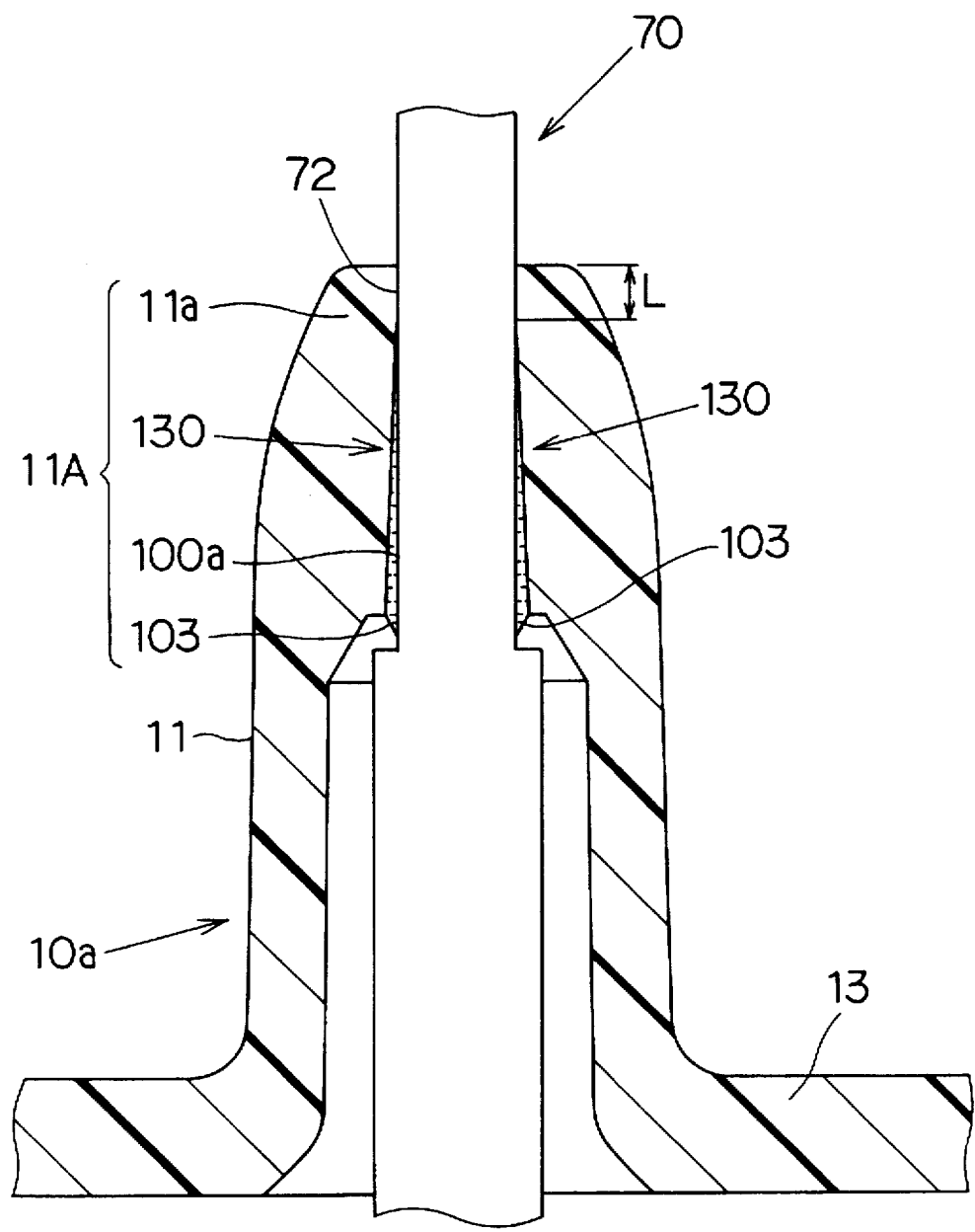
FIG. 6 is a cross-sectional view illustrating a main portion of an upper bobbin and a shaft of an indicator according to a second embodiment of the present invention.

A surface bearing according to a second embodiment is described with reference to FIG. 6.

The surface bearing has an oil reservoir portion 130 which has a surface tapering off toward the edge bearing portion 11a from a portion including the seal portion 103.

(Other variations)

The surface bearing 11A can be provided on the lower bobbin 10b instead of the ball bearing.

The surface bearing according to the present invention can be applied to other instrument other than the cross-coil-type meter. For example, it can be installed to an indicating instrument driven by a step motor.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A surface bearing for receiving a rotary shaft comprising:

a body member having an inner periphery defining a center hole through said body member, said center hole being adapted to receive said rotary shaft, wherein a bearing portion of said body member is provided by a portion of the inner periphery at an end of said body member, said bearing portion being adapted to rotatable support said rotary shaft by a lubricating oil film supplied thereto, an oil reservoir portion of said body member is provided by a portion of the inner periphery axially displaced from said bearing portion, said oil reservoir portion being adapted to hold lubricating oil in an oil reservoir defined between said oil reservoir portion and said shaft when said shaft is received in said center hole, a seal portion of said body member is provided by a portion of the inner periphery adjacent to said oil reservoir portion on a side opposite to said bearing portion, said seal portion being sized to provide a sufficiently small gap between said seal portion and said shaft when said shaft is received in said center hole to prevent oil leakage, an oil supply passage portion is provided by a portion of the inner periphery between said bearing portion and said reservoir portion, said oil supply passage portion being configured to supply lubricating oil from said oil reservoir to said bearing portion by capillary action along a space between said oil supply passage portion and said shaft when said shaft is received in said center hole, and wherein said inner periphery of said oil reservoir portion has an inside diameter larger than a diameter of said bearing portion, and wherein said oil supply passage portion has a conical surface tapering inwardly toward said bearing portion.

2. A surface bearing as claimed in claim 1, wherein said oil reservoir portion is composed of a first annular groove adjacent to said bearing portion and a second annular groove which has an inside diameter larger than that of said first annular groove.

3. A rotary device comprising a surface bearing and a rotary shaft, wherein said surface bearing comprises:

a cylindrical body member having an inner periphery defining a center hole through which said rotary shaft extends, wherein a bearing portion of said body member for rotatably supporting said rotary shaft is provided by a portion of the inner periphery at an end of said body member, an oil reservoir portion of said body member for holding lubricating oil in an oil reservoir defined between said oil reservoir portion and said shaft is provided by a portion of the inner periphery axially displaced from said bearing portion, a seal portion of said body member is provided by a portion of the inner periphery adjacent to said oil reservoir portion on a side opposite to said bearing portion, said seal portion being sized to provide a sufficiently small gap between said inner periphery and said shaft to prevent oil leakage, and an oil supply passage portion for supplying lubricating oil from said oil reservoir to said bearing portion is provided by a portion of the inner periphery between said bearing portion and said reservoir portion, said oil supply passage portion being configured to supply lubricating oil from said oil reservoir to said bearing portion by capillary action along a space between said oil supply passage portion and said shaft, wherein said rotary shaft has a slide surface in contact with said bearing portion and a seal surface facing said seal portion and having a diameter larger than said slide surface.

4. A surface bearing as claimed in claim 3, wherein an axial length of said seal portion is longer than an axial length of said oil reservoir portion.

5. A surface bearing comprising:

a cylindrical body member having an inner periphery defining a center hole, said center hole being adapted to receive a rotary shaft, wherein said inner periphery of said body member includes:

a bearing groove having a diameter larger than said rotating shaft by a thickness of an oil film;

an oil reservoir groove axially displaced from said bearing groove, said oil reservoir groove being adapted to hold lubricating oil between said oil reservoir groove and an outer periphery of said shaft when said shaft is received in said center hole;

an oil supply groove disposed between said bearing groove and said oil reservoir groove, said oil supply groove being sized to provide a gap between said shaft, when said shaft is received in said center hole, and said oil supply groove such that lubricating oil can be supplied to said bearing groove by capillary action; and a seal groove adjacent to said oil reservoir groove at a side opposite said oil supply groove, said seal groove being sized to provide a narrow gap between said seal groove and said shaft, when said shaft is received in said center hole, to prevent leakage of lubricating oil.

6. A surface bearing as claimed in claim 5, wherein said oil reservoir groove comprises a first annular groove adjacent to said bearing groove and a second annular groove which has an inside diameter larger than a diameter of said first annular groove, wherein a gap between said second annular groove and said outer periphery of said rotating shaft is three to five times as large as a gap between said first annular groove and said outer periphery of said rotating shaft.

7. An indicating instrument comprising:

an indicator;

an indicator shaft disposed on said indicator;

a driving unit for moving said indicator shaft; and a housing having an inner periphery for receiving said indicator shaft, said inner periphery of said housing comprising a bearing groove disposed at an end of said inner periphery for supporting said indicator shaft, an oil reservoir groove axially displaced from said bearing groove, a capillary groove disposed between said oil reservoir groove and said bearing groove, and a seal groove disposed adjacent to said reservoir groove at a side opposite to said bearing groove, wherein said oil reservoir groove comprises an annular groove adjacent to said bearing groove and having an inside diameter larger than a diameter of said bearing groove and a second annular groove having an inside diameter larger than a diameter of said first annular groove.

8. An indicating instrument as claimed in claim 7, wherein said indicator shaft has a first shaft portion in sliding contact with said bearing groove, and a second portion having a diameter larger than a diameter of said first shaft portion and facing said second annular groove at a gap small enough to hold lubricating oil.

9. An indicating instrument as claimed in claim 7, wherein an axial length of said seal groove is longer than an axial length of said second annular groove of said reservoir groove.

10. An indicating instrument comprising:

an indicator;

an indicator shaft disposed on said indicator;

a driving unit for moving said indicator shaft; and a housing having an inner periphery for receiving said indicator shaft, said inner periphery of said housing comprising a bearing groove disposed at an end of said inner periphery for supporting said indicator shaft, an oil reservoir groove axially displaced from said bearing groove, a capillary groove disposed between said oil reservoir groove and said bearing groove, and a seal groove disposed adjacent to said reservoir groove at a side opposite to said bearing groove, wherein said capillary groove has a conical surface tapering inwardly toward said bearing groove and disposed coaxially with said indicator shaft.

11. An indicator instrument as claimed in claim 10, wherein a gap between a bottom of said conical surface and an outer periphery of said indicator shaft is small enough to hold said lubricating oil therebetween.

12. An indicator instrument as claimed in claim 11 further including a dial plate, wherein said bearing groove is disposed between said dial plate and said driving unit.

13. An indicator instrument as claimed in claim 12, wherein said driving unit is disposed in said housing, and said indicator shaft has one end extending outward from said dial plate and the other end connected to said driving unit.

14. An indicator instrument as claimed in claim 13, wherein said driving unit has a permanent magnet and a chamber accommodating said permanent magnet and damper oil.

* * * * *